United States Patent
Govind et al.

(10) Patent No.: US 7,556,301 B2
(45) Date of Patent: Jul. 7, 2009

(54) DYNAMICALLY DECONSTRUCTABLE ARMREST FOR AUTOMOTIVE VEHICLE

(75) Inventors: Shrinivas Govind, Canton, MI (US); Nagaraj Mariyappa, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 519 days.

(21) Appl. No.: 11/308,467

(22) Filed: Mar. 28, 2006

(65) Prior Publication Data
US 2007/0228757 A1 Oct. 4, 2007

(51) Int. Cl.
*B60R 21/04* (2006.01)

(52) U.S. Cl. .............. 296/24.34; 296/1.09; 296/187.05; 296/187.12; 296/153

(58) Field of Classification Search ............ 296/24.34, 296/1.09, 187.05, 187.12, 153, 146.7; 297/115–117; 280/748, 751, 752
See application file for complete search history.

(56) References Cited

U.S. PATENT DOCUMENTS

| | | | | |
|---|---|---|---|---|
| 3,428,357 A | * | 2/1969 | Lueck | 296/24.34 |
| 3,623,768 A | | 11/1971 | Capener et al. | |
| 5,395,135 A | | 3/1995 | Lim et al. | |
| 5,482,344 A | | 1/1996 | Walker et al. | |
| 5,527,084 A | * | 6/1996 | Scherf | 296/153 |
| 5,603,548 A | | 2/1997 | Gandhi et al. | |
| 5,730,458 A | | 3/1998 | Byon | |
| 5,803,415 A | * | 9/1998 | Konishi et al. | 248/118 |
| 5,951,094 A | * | 9/1999 | Konishi et al. | 296/153 |
| 5,967,594 A | * | 10/1999 | Ramanujam | 296/153 |
| 6,217,119 B1 | | 4/2001 | Cook et al. | |
| 6,248,205 B1 | * | 6/2001 | Scheidmantel et al. | 156/309.6 |
| 6,568,743 B1 | * | 5/2003 | Jayasuriya et al. | 296/153 |
| 6,742,830 B2 | | 6/2004 | Zimmerman et al. | |
| 6,890,012 B2 | * | 5/2005 | Maierholzner | 296/24.34 |
| 6,893,077 B1 | * | 5/2005 | DeJongh | 296/187.05 |
| 6,899,363 B2 | * | 5/2005 | Dry | 296/1.09 |
| 6,955,391 B1 | | 10/2005 | Peng | |
| 6,983,967 B2 | * | 1/2006 | Scheidmantal et al. | 296/1.09 |
| 7,070,221 B2 | * | 7/2006 | Cowelchuk et al. | 296/39.1 |
| 7,104,590 B2 | * | 9/2006 | Dooley et al. | 296/153 |
| 7,121,611 B2 | * | 10/2006 | Hirotani et al. | 296/146.7 |
| 7,144,067 B2 | * | 12/2006 | Gramss | 296/153 |
| 2004/0178660 A1 | * | 9/2004 | Dry | 296/153 |
| 2005/0194828 A1 | | 9/2005 | Johnson et al. | |

FOREIGN PATENT DOCUMENTS

DE   10211656 C1   7/2003
JP   2002046520 A   2/2002

* cited by examiner

*Primary Examiner*—Glenn Dayoan
*Assistant Examiner*—Gregory Blankenship
(74) *Attorney, Agent, or Firm*—Dickinson Wright PLLC; Frank MacKenzie

(57) ABSTRACT

A dynamically deconstructable armrest for an automotive vehicle includes a number of walls extending from a mounting base so as to define a cavity within which arm contact member is seated. Compressive force directed laterally against at least one of the side walls and having a magnitude in excess for a predetermined threshold value will cause at least a portion of the arm contact member to become expelled from the cavity, so as to lessen the compressive strength of the armrest.

4 Claims, 4 Drawing Sheets

DYNAMICALLY DECONSTRUCTABLE ARMREST FOR AUTOMOTIVE VEHICLE

BACKGROUND OF THE INVENTION

The present invention relates to a vehicular armrest which deforms in a controlled manner as a result of a geometry change caused by compressive force during an impact event.

Vehicle designers have drawn their attention in recent years to the provision of energy-absorbing vehicle interiors. Interior trim systems associated with the side structures of vehicles have been of particular interest as designers have sought to provide more comprehensive, or tailored, energy absorption characteristics for handling side impact events. U.S. Pat. No. 6,742,830 discloses a vehicle door having at least two deformable areas, including an armrest which is caused to change its shape by bending the material of the armrest during a side impact. This construction suffers from the problem that an armrest which has sufficient strength to function properly during normal usage of the vehicle will not usually prove to be a sufficiently accommodating structure to present a softer surface to a motorist during an impact event. U.S. Pat. No. 6,568,743, which is assigned to the assignee of the present invention, illustrates an armrest which is mechanically pulled down into a door trim panel in the result of an impact against the door. It is noted that the system of the '743 patent requires an impact upon a certain region of the outer portion of the door to achieve the motion of pulling the armrest downwardly, and although providing some accommodation to the motorist, its effectiveness is circumscribed by this actuation requirement.

An armrest system according to the present invention is dynamically deconstructable inasmuch as an impact directed against the armrest, and having a magnitude in excess of a predetermined threshold value, will cause the armrest to change geometry as a portion of the armrest is expelled from alignment with its mating portion, so as to modulate the energy input into a motorist during an impact event.

SUMMARY OF THE INVENTION

A dynamically deconstructable armrest for an automotive vehicle includes a mounting base, a plurality of walls extending from the mounting base and defining a cavity, and an arm contact member inserted into the cavity such that a compressive force directed against at least one of the walls, and having a magnitude in excess of a predetermined threshold value, will cause a portion of the arm contact member to become expelled from the cavity, so as to deconstruct the armrest. The mounting base may be incorporated either within a door trim panel, or within a center storage console of a vehicle, or within other vehicular structures upon which an armrest is mounted. A cover extends over the arm contact member and the plurality of walls. The arm contact member, which is preferably a plug fit within the cavity defined by the armrest walls, may either end at the top of the walls or may extend externally of the walls. If the arm contact member extends externally of the walls, the dynamic compressive force direct against at least one of the side walls will cause the armrest to disengage from an exterior portion of the sidewalls. In this manner, the armrest will be dynamically deconstructed.

In essence, a dynamic compressive force directed against at least one of the side walls of the armrest and having a magnitude in excess of a predetermined threshold value will cause at least a portion of the arm contact member, or insert, to deform and to move translationally from the cavity such that the compressive strength of the armrest will be reduced. The arm contact member is generally frustum-shaped and matches a frustum-shaped cavity formed within the armrest base by a plurality of upstanding walls. This wedge-shaped construction causes the arm contact member to be moved translationally or to squirm from its installed position in response to a compressive load directed against the side of the armrest, such as the load imposed upon the thoracic region of a motorist during an impact event is lessened.

It is an advantage of a system according to the present invention that an automotive armrest will have sufficient strength to exhibit robust performance during normal operation of the vehicle, while at the same time providing a more compliant structure in an event of an impact causing a motorist to contact the armrest.

It is another advantage of a dynamically deconstructable armrest system according to present invention that the performance characteristics of the armrest are more predictable, and repeatable, and tunable, due to the ability of the armrest to change geometry during an impact event.

Other advantages, as well as objects and features of the present invention, will become apparent to the reader of this specification.

DETAILED DESCRIPTION OF THE PREFERRED EMBODIMENTS

Figure 1:
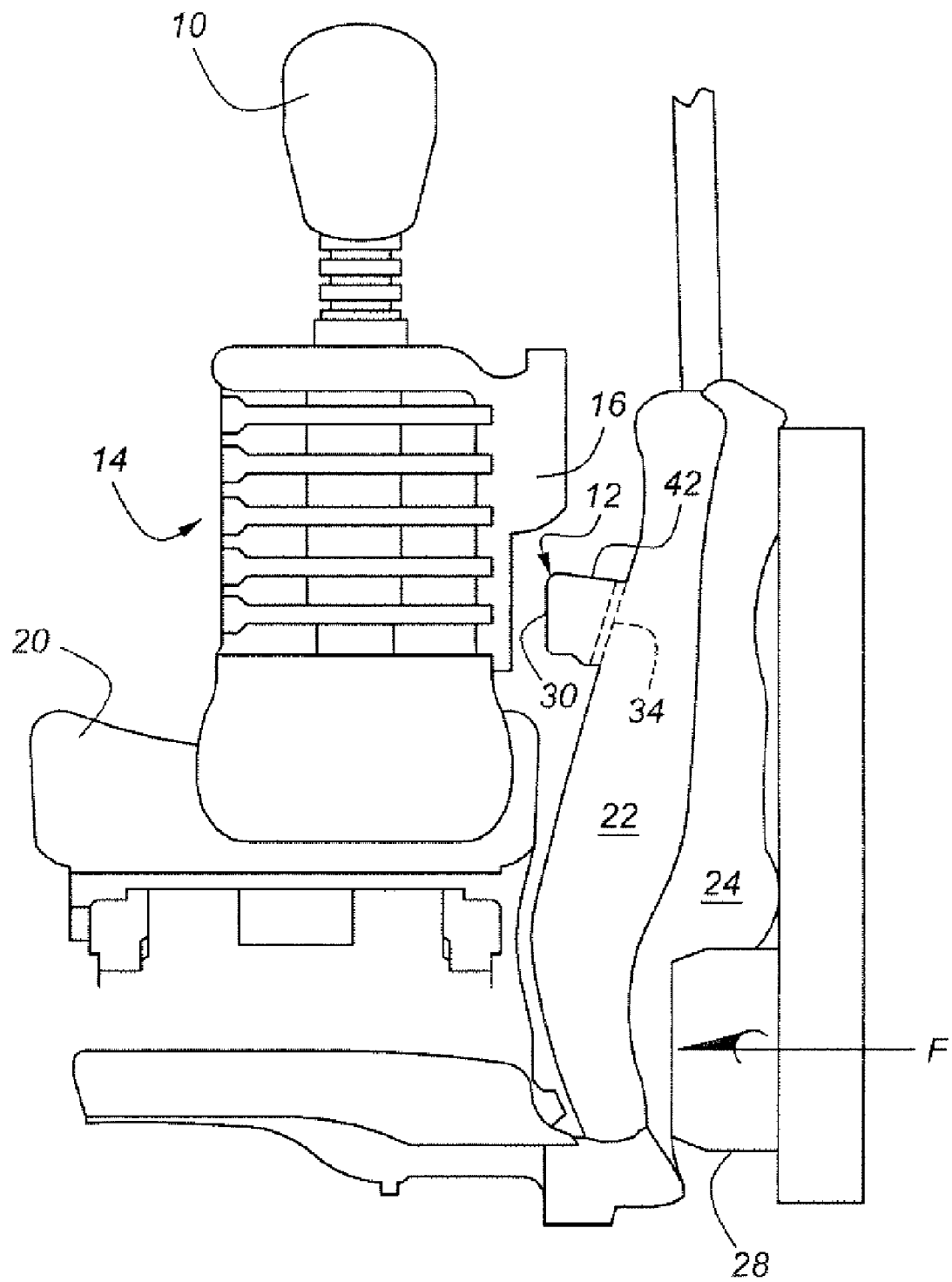
FIG. 1 is a rear elevation, partially in section, of an occupant seated within a vehicle adjacent to the present inventive armrest system.
Figure 6:
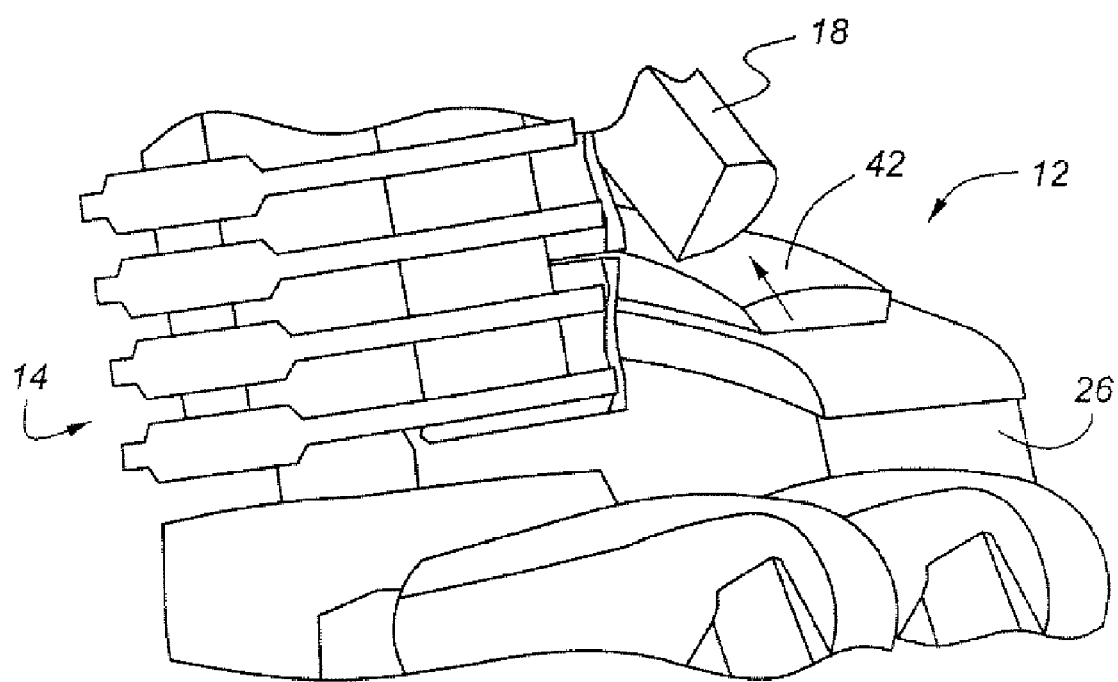
FIG. 6 is similar to FIG. 5, but shows an occupant of a vehicle impacting a center console having an armrest according to the present invention.

As shown in FIG. 1, vehicle occupant 10 is seated upon a seat cushion, 20. Occupant 10 has arm 16, which is poised in FIG. 1 to be placed upon armrest assembly 12. More precisely, occupant arm 16 is poised to be placed upon arm contact member 42, which extends generally horizontally at the upper surface of armrest assembly 12. Armrest assembly 12 is mounted to a mounting base, which, in the case of FIG. 1, is door trim panel 22. In the illustration of FIG. 6, armrest 12 is mounted to a center storage console, 26.

Occupant 10 has a thoracic region, 14, which may contact armrest 12 during certain side-directed impact events. In FIG. 1, vehicle door 24 is shown as being an impacted by a pendulum type of test device, 28, which causes deformation of door 24 including trim panel 22, with the impact ultimately resulting in a contact between thoracic region 14 of occupant 10 and armrest assembly 12.

Figure 2:
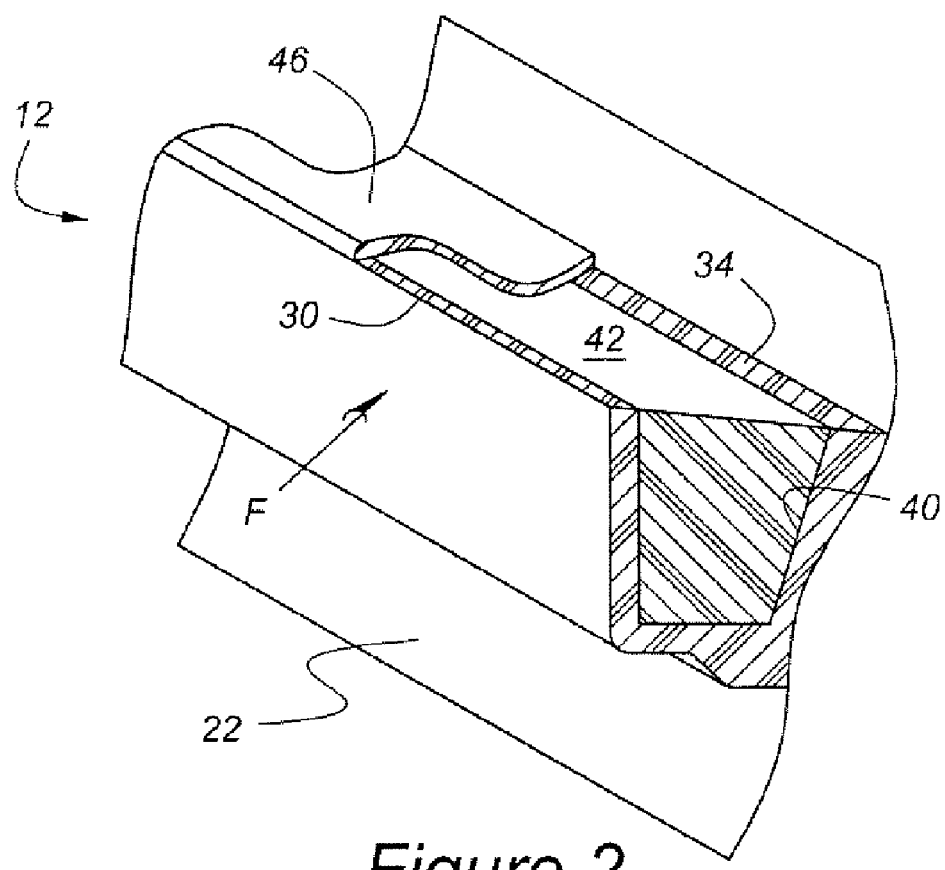
FIG. 2 is a perspective view of a portion of an armrest according to the present invention.
Figure 2A:
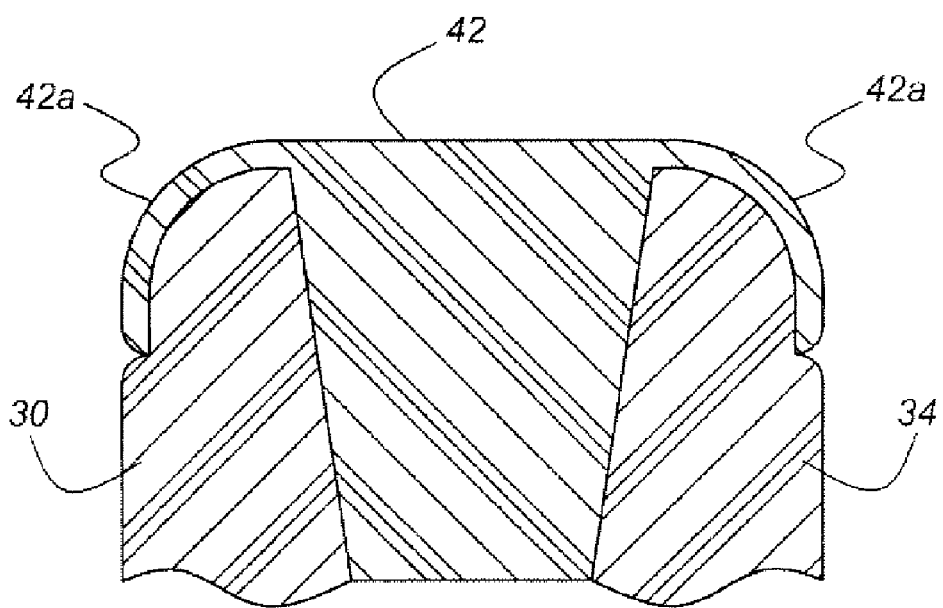
FIG. 2A is a sectional view of a portion of a variant of an armrest shown in FIGS. 1 and 2.

FIGS. 2 and 2a illustrate the structural attributes of armrest 12 which cause its dynamic deconstruction during an impact event. Inner wall 30 and outer wall 34 define a cavity, 40, which, although having a generally rectangular configuration, is frustum-shaped, which gives armrest surface 42 the illustrated plug shape. This plug shape causes a ramping effect when armrest 12 is impacted by a force, (F), directed as shown in FIG. 2. The walls 30 and 34 cause the arm contact member 42 to be locally extruded or expelled from cavity 40.

Once, arm contact member 42 has become only slightly misaligned with walls 30 and 34, the force/deflection curve in the direction F of FIG. 2 becomes greatly reduced, so as to present a softer surface to the thoracic region 14 of occupant 10. In the construction of FIG. 2a, arm contact surface 42 has two portions, 42a which depend over inner wall 30 and outer wall 34, as an alternate structure for trimming the interface between arm contact member 42 and walls 30 and 34. In the embodiment of FIG. 2, cover 46, in which may be constructed of plastics, such as vinyl or other materials, is applied over the upper surfaces of armrest 12 in order to conceal the joint between arm contact member 42 and walls 30 and 34.

Walls 30, 34 and arm contact member 42 are preferably formed from plastic material such as polypropylene or acrylonitrile butadiene styrene (ABS). Contact member 42 is preferably a tight, wedge fit within cavity 40. It is further preferable that member 42 be retained within cavity 40 without the use of adhesives or ultrasonic bonding.

Because dislocation of arm contact member 42 with respect to cavity 40 occurs only when a laterally directed compressive force having a magnitude in excess of a predetermined threshold is directed against walls 30 or 34, pulling upon the armrest, or leaning upon the armrest during normal use will not cause displacement of arm contact member 42. However, an impact load will cause translational movement of the arm contact member 42 with respect to cavity 40.

Figure 3:
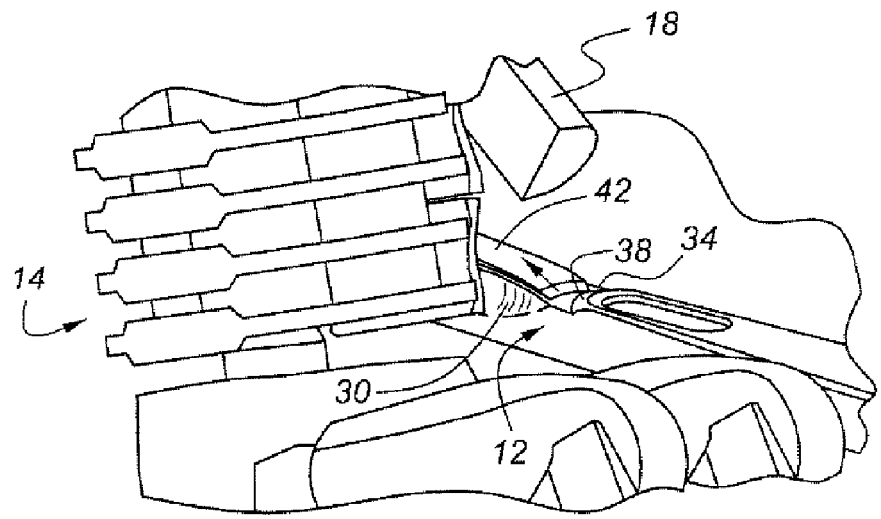
FIGS. 3, 4 and 5 illustrate the sequential deconstruction of an armrest according to the present invention as the armrest is impacted by the occupant of FIG. 1.
Figure 4:
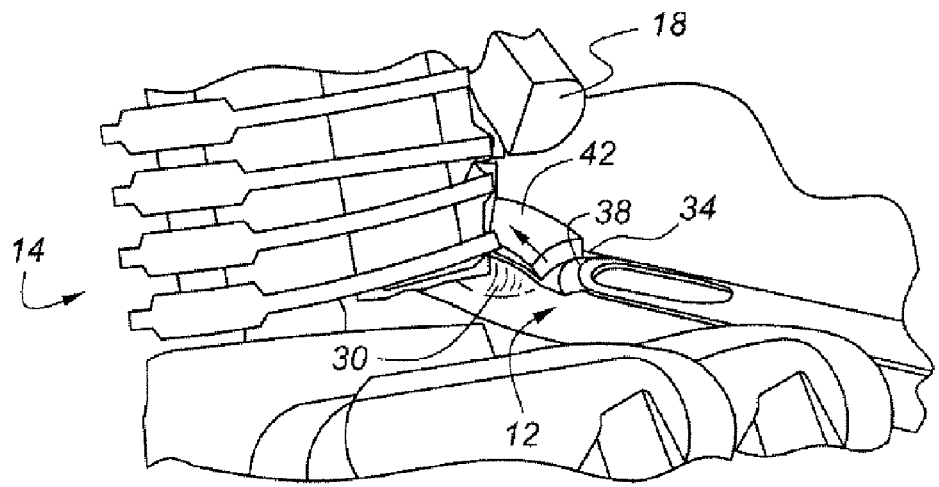
Figure 5:
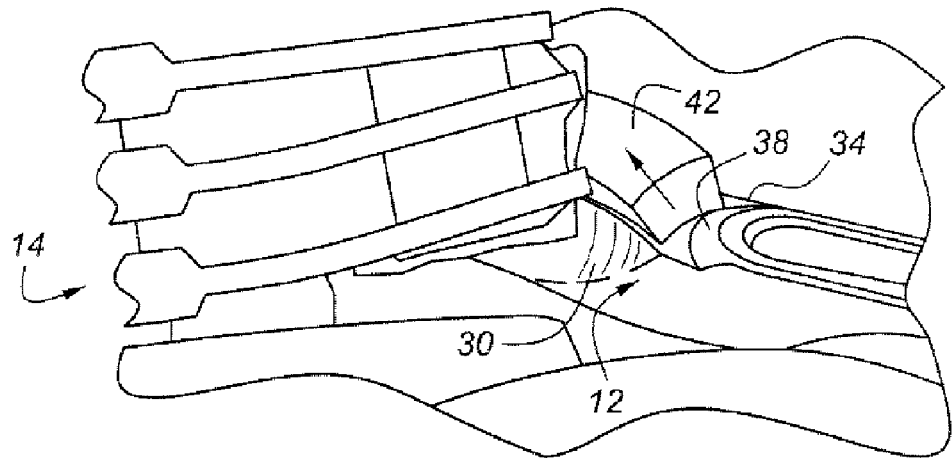

FIGS. 3-5 illustrate the sequential engagement of thoracic region 14 of occupant 10 with armrest 12 during an impact event, accompanied by the deconstruction of armrest 12. In FIG. 3, arm contact member 42 is shown as being dislocated slightly from inner wall 30 and outer wall 34, while still contacting end wall 38. In FIG. 4, it is noted that arm contact member 42 has become expelled to a greater degree from cavity 40 and, inner wall 30 has become deformed as well. In FIG. 5, end wall 38, inner wall 30, and outer wall 34 are all deformed, as is arm contact member 42, which has become even more dislocated translationally from its original position within cavity 40.

In FIG. 6, occupant 10 is shown as contacting center console 26, having an armrest 12 according to the present invention. Armrest 12 is shown as during one of the initial stages of deconstruction similar to those illustrated in FIG. 3. The mechanics of deconstruction of the embodiment shown in FIG. 6 are similar to those illustrated in FIGS. 3-5.

Although the present invention has been described in connection with particular embodiments thereof, it is to be understood that various modifications, alterations, and adaptations may be made by those skilled in the art without departing from the spirit and scope of the invention set forth in the following claims.

What is claimed is:

1. A dynamically deconstructable armrest for an automotive vehicle, comprising:
    a mounting base;
    a plurality of sidewalls operatively connected with said mounting base and defining a generally frustum-shaped cavity; and
    a generally frustum-shaped arm contact member inserted into said cavity such that a dynamic compressive force directed against at least one of said sidewalls, and having a magnitude in excess of a predetermined threshold value, will cause at least a portion of the arm contact member to be expelled from said cavity, such that the laterally-directed compressive strength of the armrest will be reduced.

2. A dynamically deconstructable armrest according to claim 1, wherein said sidewalls and said arm contact member comprise molded plastics.

3. A dynamically deconstructable armrest according to claim 1, wherein said mounting base comprises a door trim panel.

4. A dynamically deconstructable armrest according to claim 1, wherein said mounting base comprises a center storage console.

* * * * *